(12) United States Patent
Yao et al.

(10) Patent No.: US 8,899,366 B2
(45) Date of Patent: Dec. 2, 2014

(54) ELECTROMECHANICAL CONTROL SYSTEM OF ELECTRIC BICYCLE INTEGRATING SMART MOBILE DEVICE AND CLOUD SERVICES

(71) Applicant: Li-Ho Yao, Taipei (TW)

(72) Inventors: Li-Ho Yao, Taipei (TW); Sung-Ching Lin, Taipei (TW)

(73) Assignee: Li-Ho Yao, Taipei (TW)

( * ) Notice: Subject to any disclaimer, the term of this patent is extended or adjusted under 35 U.S.C. 154(b) by 0 days.

(21) Appl. No.: 14/082,329

(22) Filed: Nov. 18, 2013

(65) Prior Publication Data

US 2014/0209400 A1    Jul. 31, 2014

(30) Foreign Application Priority Data

Jan. 25, 2013  (TW) .............................. 102102839 A

(51) Int. Cl.
     *B62M 6/45*          (2010.01)
(52) U.S. Cl.
     CPC ...................................... *B62M 6/45* (2013.01)
     USPC ........................... 180/167; 180/220; 180/65.1
(58) Field of Classification Search
     USPC ........ 180/167, 168, 169, 220, 221, 65.1, 312;
                                      701/22, 99, 123, 207, 213
     See application file for complete search history.

(56) References Cited

U.S. PATENT DOCUMENTS

| 5,857,537 | A | * | 1/1999 | Matsumoto et al. ....... 180/206.5 |
| 6,734,376 | B2 | | 5/2004 | Ichida et al. |
| 7,192,169 | B2 | | 3/2007 | Takeda |
| 7,386,482 | B2 | | 6/2008 | Kokatsu et al. |
| 8,364,389 | B2 | * | 1/2013 | Dorogusker et al. ......... 701/300 |
| 8,634,979 | B2 | * | 1/2014 | Chien et al. ..................... 701/22 |
| 2009/0181826 | A1 | | 7/2009 | Turner |
| 2010/0198453 | A1 | | 8/2010 | Dorogusker et al. |

FOREIGN PATENT DOCUMENTS

| TW | 201028325 A | 8/2010 |
| TW | 201212977 A | 4/2012 |

* cited by examiner

*Primary Examiner* — John Walters
(74) *Attorney, Agent, or Firm* — Alan D. Kamrath; Kamrath IP Lawfirm, P.A.

(57) ABSTRACT

An electromechanical control system of an electric bike integrating a smart mobile device and cloud services therewith enables a controller of the electric bike to independently monitor and control operation of an electric motor, is integrated with an external smart mobile device with a communication interface thereof, configures cycling control parameters of the controller with the externally available cycling control parameters through an user interface provided by the smart mobile device to adapt to cyclists' physical strength. Cycling information and bike information can be displayed on the smart mobile device or make them openly available through the online function of the smart mobile device for cyclists to easily record or manage related information during bike cycling.

90 Claims, 13 Drawing Sheets

ELECTROMECHANICAL CONTROL SYSTEM OF ELECTRIC BICYCLE INTEGRATING SMART MOBILE DEVICE AND CLOUD SERVICES

CROSS-REFERENCE TO RELATED APPLICATIONS

This application claims the benefit of Taiwan patent application No. 102102839, filed on Jan. 25, 2013, the disclosure of which is incorporated herein in its entirety by reference.

BACKGROUND OF THE INVENTION

1. Field of the Invention

The present invention relates to an electromechanical control system of electric bicycle and more particularly to an electromechanical control system integrating smart mobile communication device and cloud services 2. Description of the Related Art Cycling is popular almost everywhere. More and more people are riding bikes regularly. As physical strength varies from person to person, to cope with various riding conditions, cyclists may experience different loading conditions. Hence, the electric power driving mechanism has been brought into play to lower cyclists' loads upon riding bikes. Meanwhile, since personal smart mobile devices have gradually become one of the most often carried items of people in their daily life, some programs associated with cycling are already developed and are supported to run on personal smart mobile devices. On the one hand, cyclists can acquire desired cycling information upon riding bikes, and on the other hand, given the functions of the personal smart mobile devices, cyclists can also enjoy the access to the Internet, GPS features, social networking websites and the like.

Each conventional electric bike is usually equipped with a control panel and a controller for the cyclists to know the remaining power of the battery or other parameters controlling functions of the electric bike. If a personal smart mobile device is additionally equipped in the bike for the purpose of accessing other information therethrough, the electric bike needs one more device for cyclists to read and manipulate the information. This requirement not only causes space allocation concern on the handle bar of the bike but also diverts riders' attention to different devices to meet different operation demands. Hence, integrating the control panel of the electric power driving mechanism of the electric bike on a personal smart mobile device as an extended function of the personal mobile device has become a trend recently. However, such personal smart mobile device only replaces the control panel of the electric power driving mechanism without truly combining both advantages of the personal smart mobile device and the electric power driving mechanism. As a result, the present invention fully integrates a personal smart mobile device with an electric power driving mechanism from the aspects of hardware structure and communication software, thereby providing complementary and extended functions for cyclists to ride all kinds of bikes.

SUMMARY OF THE INVENTION

An objective of the present invention is to provide an electromechanical control system of an electric bike integrating a smart mobile device and cloud services therewith.

To achieve the foregoing objective, the electromechanical control system of an electric bike integrating a smart mobile device has an electromechanical assembly, a cycling status detection assembly, a controller and a smart mobile device.

The electromechanical assembly is adapted to have an electric motor and a battery mounted on an electric bike to drive a wheel axle of the electric bike.

The cycling status detection assembly detects cycling status of the electric bike and outputs the cycling status.

The controller is electrically connected to the electromechanical assembly and the cycling status detection assembly to control operation of the electric motor, receives the cycling status, and processes the cycling status into cycling information and bike information. The controller has a communication interface and is built in with a cycling control procedure and an export control procedure. The cycling control procedure configures cycling control parameters for controlling the operation of the electric motor to simulate different road conditions for cycling, and controls the operation of the electric motor according to the cycling information, the bike information and the cycling control parameters, and the export control procedure makes a part of cycling control parameters openly available for external configuration, and makes the cycling information and the bike information openly available for output.

The smart mobile device is connected to the communication interface of the controller to perform bidirectional communication therewith, and provides a user interface for launching the export control procedure of the controller, sets up the openly available cycling control parameters, and obtains the cycling information and bike information for storage and display.

The controller of the electric bike can independently monitor and control the operation of the electric motor and can be integrated with an external smart mobile device, such as a smart phone, through the use of a communication interface of the controller. Cyclists can set up the cycling control parameters of the controller through a user interface provided by the smart mobile device to adapt to different physical strength of cyclists. Besides, the cycling information and the bike information can be displayed on the smart mobile device or make them openly available through the online function of the smart mobile device for cyclists to easily record or manage related information. Accordingly, the controller of the present invention displays the cycling information and the bike information in collaboration with the smart mobile device. Cyclists do not get distracted by watching different devices at the same time during bike cycling. After the smart mobile device transmits a control command to the controller, even if there is no smart mobile device, the operation of the electric motor can still be smoothly monitored and controlled by the controller alone.

To achieve the foregoing objective, the electromechanical control system of an electric bike integrating a smart mobile device has an electromechanical assembly, a cycling status detection assembly, a controller, a smart mobile device, and a network platform.

The electromechanical assembly is adapted to have an electric motor and a battery mounted on an electric bike to drive a wheel axle of the electric bike.

The cycling status detection assembly detects cycling status of the electric bike and outputs the cycling status.

The controller is electrically connected to the electromechanical assembly and the cycling status detection assembly to control operation of the electric motor, receives the cycling status, and processes the cycling status into cycling information and bike information. The controller has a communication interface and is built in with a cycling control procedure and an export control procedure. The cycling control procedure configures cycling control parameters for controlling the operation of the electric motor to simulate different road conditions for cycling, and controls the operation of the electric motor according to the cycling information, the bike information and the cycling control parameters, and the export control procedure makes a part of cycling control parameters openly available for external configuration, and makes the cycling information and the bike information openly available for output.

The smart mobile device is connected to the communication interface of the controller to perform bidirectional communication therewith, and provides a user interface for launching the export control procedure of the controller, sets up the openly available cycling control parameters, and obtains the cycling information and bike information for storage and display.

The network platform provides at least one application program for the smart mobile device to download and execute. The smart mobile device uploads its stored cycling information and bike information to the network platform through the executed application program.

The foregoing electromechanical control system additionally has a network platform for the smart mobile device to execute an application program provided by the network platform and then to download more diversified monitoring and control modes. The operation of the electric motor of the electric bike can be remotely monitored and controlled, thereby easily managing bike information and sharing cycling information among cyclists. Accordingly, many types of cloud services can be provided through the network platform in collaboration with the development of application programs to increase the fun of riding the electric bike.

Other objectives, advantages and novel features of the invention will become more apparent from the following detailed description when taken in conjunction with the accompanying drawings.

DETAILED DESCRIPTION OF THE INVENTION

Figure 1:
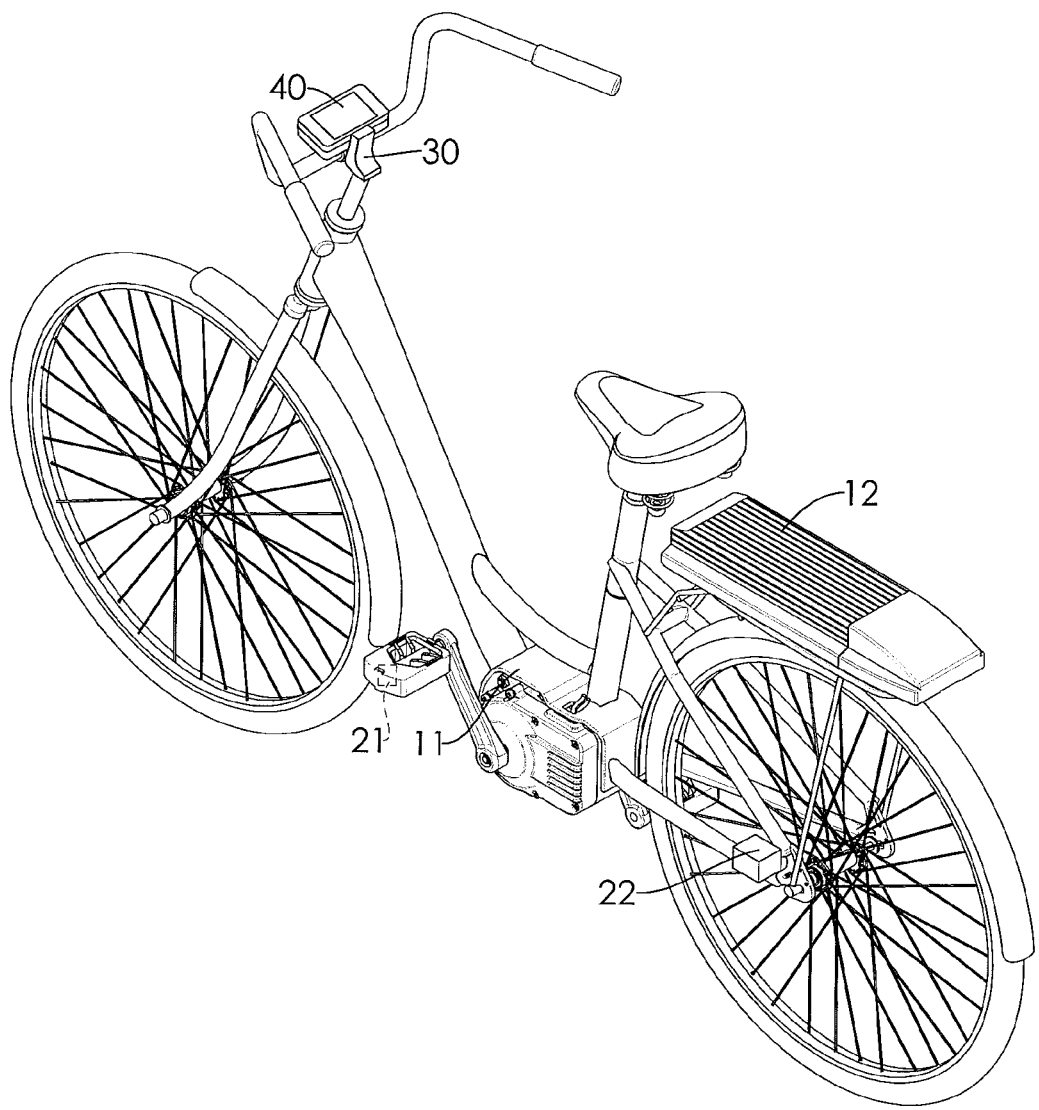
FIG. 1 is a perspective view of an electromechanical control system applied to an electric bike in accordance with the present invention.
Figure 2:
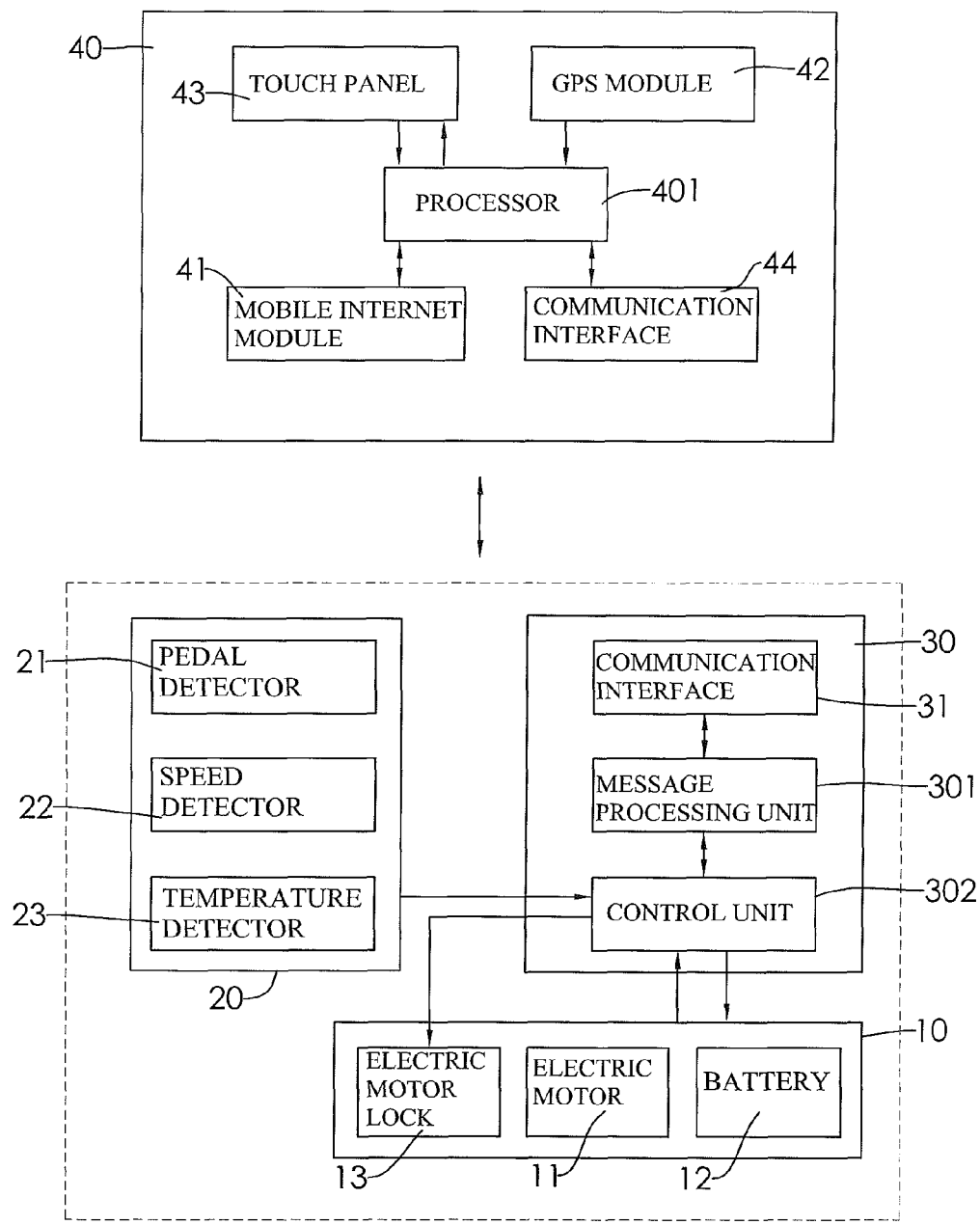
FIG. 2 is a functional block diagram of the electromechanical control system in FIG. 1.

With reference to FIGS. 1 and 2, an embodiment of an electromechanical control system of an electric bike integrating a smart mobile device and cloud services therewith in accordance with the present invention has an electromechanical assembly 10, a cycling status detection assembly 20, a controller 30, and a smart mobile device 40.

The electromechanical assembly 10 has an electric motor 11 and a battery 12 mounted on an electric bike to drive a wheel axle of the electric bike. The electric motor 11 can optionally have an electric motor lock 13 preventing the electric motor 11 from being rotated with a mechanism. The electric motor 11 can drive a front wheel axle or a rear wheel axle directly or through a transmission mechanism to rotate.

The cycling status detection assembly 20 detects cycling status of the bike and output the cycling status, and has a pedal detector 21, a speed detector 22, and a temperature detector 23.

The controller 30 is mounted on the bike and is electrically connected to the electromechanical assembly 10 and the cycling status detection assembly 20 to control the operation of the electric motor 11, lock or unlock the electric motor lock 13, receive the cycling status including cycling distance, cycling speed and the like, and process the cycling status into cycling information and bike information. The bike information has an average motor speed, an average motor temperature, and a remaining battery capacity. The controller 30 has a communication interface 31 and is built in with a cycling control procedure and an export control procedure. The cycling control procedure configures cycling control parameters for controlling the operation of the electric motor 11, such as rotation speed, torque and load of the electric motor, to simulate different road conditions for cycling, and controls the operation of the electric motor 11 according to the cycling information, bike information and the cycling control parameters. The export control procedure makes a part of cycling control parameters openly available for external configuration, and makes the cycling information and the bike information openly available for output. The communication interface 31 may be a small-scale wired connection interface, such as USB port and the like, or a short-distance wireless connection interface, such as Bluetooth module, WiFi module and the like.

The smart mobile device 40 may be a smart phone, a small-scale tablet computer and the like. As already having the small-scale wired connection interface, such as USB and the like, or the short-distance wireless connection interface, such as Bluetooth module, WiFi module and the like, the smart mobile device 40 can connect to the communication interface 31 of the controller 30 to perform bidirectional communication, and provides a user interface for user to launch the export control procedure of the controller 30, set up the cycling control parameters, and obtain the cycling information and bike information for storage and display. The smart mobile device 40 has a mobile Internet module 41, a GPS module 42, a touch panel 43, a communication interface 44, and a processor 401. The processor 401 is electrically connected to the mobile Internet module 41, the GPS module 42, the touch panel 43 and the communication interface 44, and is connected to the Internet through the mobile Internet module 41, controls the touch panel 43 to display an electronic map, and marks a current location on the electronic map according to a current geographical location of the smart mobile device 40.

The controller 30 has a message processing unit 301 and a control unit 302. The message processing unit 301 is electrically connected to the communication interface 31 to further connect to and communicate with the communication interface 44 of the smart mobile device 40 in a bidirectional mode, stores a control command outputted by the smart mobile device 40, converts the control command into a control signal, and outputs the control signal.

The control unit 302 is electrically connected to the message processing unit 301 to receive the control signal outputted from the message processing unit 301, controls the electromechanical assembly 10, receives a status detection signal of the cycling status detection assembly 20, converts the status detection signal into status detection data, and outputs the status detection data to the message processing unit 301 for the message processing unit 301 to further transmit the status detection data to the connected smart mobile device 40. The control unit 302 can be integrally formed with the message processing unit 301 as a common device being mountable inside a handle bar of the bike or integratable inside the electromechanical assembly 10.

As can be integrated into the smart mobile device, such as a smart phone and the like, the controller 30 should be able to correctly identify the smart mobile device 40 during operation. The message processing unit 301 of the controller 30 therefore further has a connection procedure built therein. The connection procedure is performed only after the communication interface 31 of the controller 30 detects a connection request issued from an external smart mobile device 40, and has an initialization stage, an authentication stage, and an operation stage performed in sequence.

Figure 3A:
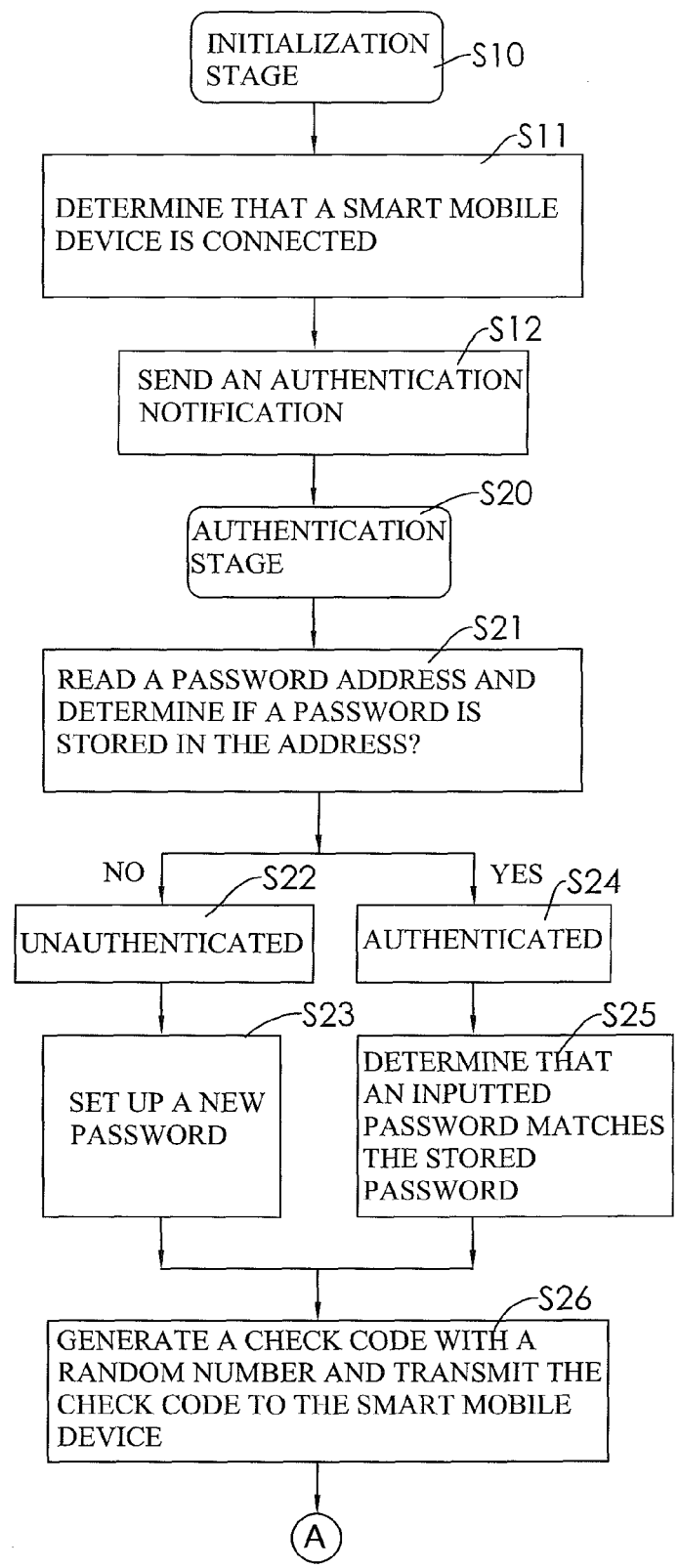
FIGS. 3A and 3B are associated with a flow diagram of a connection procedure for connecting the controller of the electromechanical control system with a smart mobile device in accordance with the present invention.
Figure 3B:
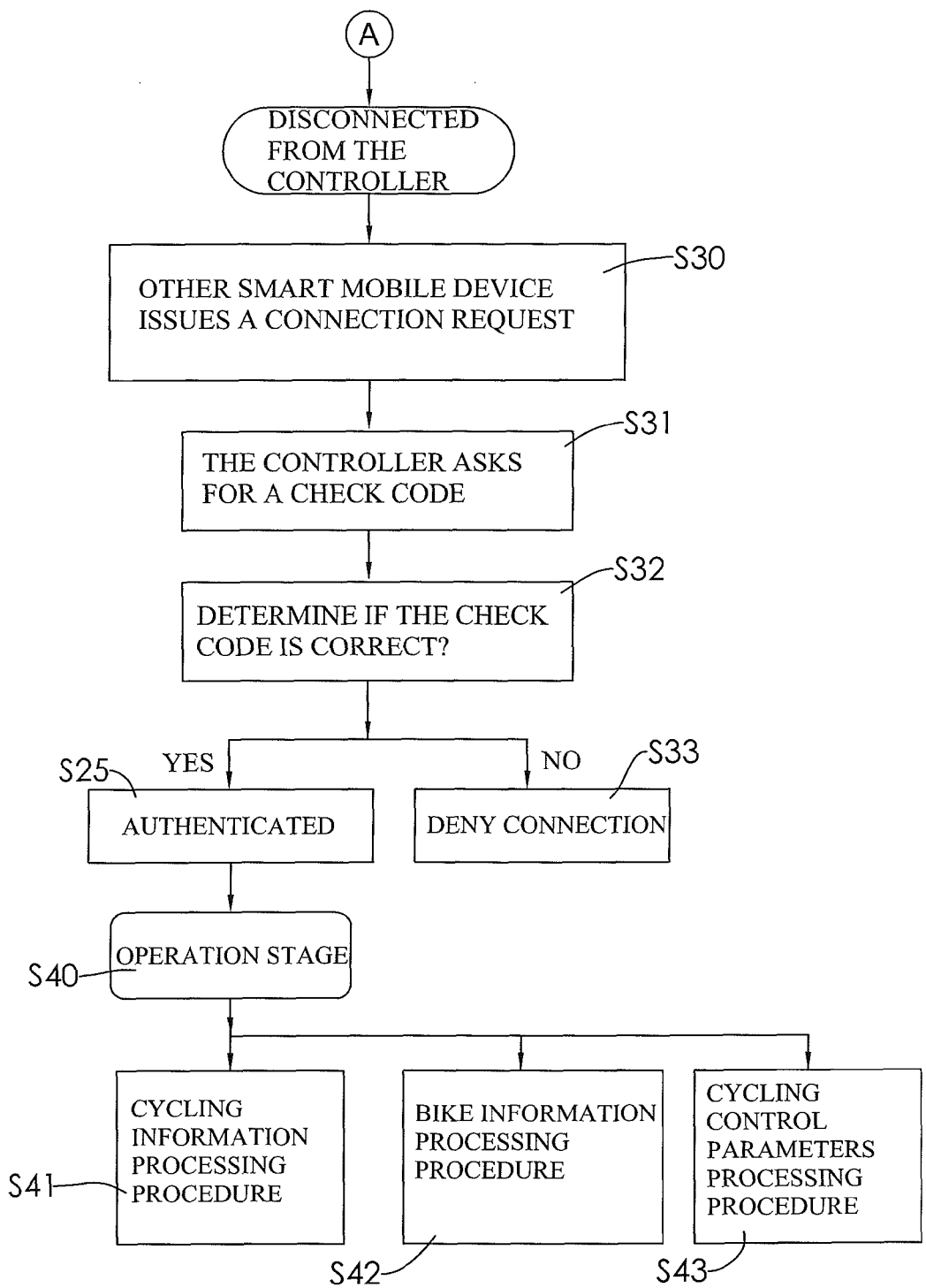

With reference to FIGS. 3A and 3B, the smart mobile device executes an application, enters the initialization stage S10 after the application program is activated, determines if connected to the controller 30 S11, and sends an authentication notification to the controller 30 after confirming the connection S12, and the controller 30 acknowledges the connection confirmation with an indicator signal or a sound and then enters the authentication stage S20. To provide anti-theft, misconnection-free and monitoring functions, two types, namely, authenticated access type and unauthenticated access type, are checked during the authentication stage. As the touch panel of the smart mobile device provides convenient and diversified input interfaces, the touch panel can serve as an interface for password input to prevent the theft of the bike. If the password authentication fails to pass, the electric motor lock 13 of the electric bike is in a locked state and it is not allowed to pedal the electric bike. As the password is directly stored in the controller 30, whoever intends to use the bike or whichever type of smart mobile device is employed, the controller 30 can only unlock the electric motor lock 13 after completing the initialization stage and passing the authentication stage. Following is detailed description for an unauthenticated processing procedure and an authenticated processing procedure.

1. When an unauthenticated access type is identified in the authentication stage, if the bike is used for the first time, the message processing unit 301 of the controller 30 determines that no password is stored therein S21 and that the current access is not authenticated S22. The message processing unit 301 then returns a response to the smart mobile device indicating that the bike is used for the first time. An application program of the smart mobile device 40 will display a password setting interface on a user interface of the smart mobile device 40 for users to set up a password used in first time authentication S23. When users finish inputting the password for the first time authentication, the password is stored in the message processing unit 301 of the controller 30 for later authentication of the password.

2. When an authenticated access type is identified in the authentication stage S24, it indicates that the message processing unit 301 of the controller 30 already has a password stored therein. The message processing unit 301 then returns a response to the smart mobile device 40 indicating that authentication can be performed. The application program of the smart mobile device 40 will display a password input interface for cyclists to input a password. The message processing unit 301 compares the inputted password with the stored password to determine if they match each other, and if negative, asks cyclists to input a password again until the inputted password and the stored password match each other S25.

After a correct password is inputted, the controller 30 unlocks the electric motor lock 13 to allow cyclists to ride the bike. Meanwhile, the controller 30 generates a check code with a random number S26 to be stored in the smart mobile device 40 as the basis of determining status of authentication performed in the controller 30. If the smart mobile device 40 is a smart phone, an application program currently running on the smart phone may be terminated by executing another application program, such as an incoming call, and the smart phone may be also disconnected from the controller 30. However, since the message processing unit of the controller 30 already stores a control command sent from the smart mobile device 40 and independently monitors and controls the operation of the electric motor 11 so that the electric bike can still be operated according to the control command from the smart mobile device 40.

Although the controller 30 can still normally control the operation of the electric bike when losing communication with a smart phone, if any other smart phone of a cyclist in the nearby issues a connection request attempting to connect to the controller 30 of the current smart phone S30, the controller 30 will ask the smart phone attempting to connect thereto to return the check code S31 as the controller 30 has been authenticated. If the smart phone attempting to connect to the controller 30 returns an incorrect check code or there is no check code in the controller 30 S32, the current smart phone will not connect to the smart phone attempting to connect thereto S33 to avoid the cycling risk arising from the unexpected connection to the smart mobile device 40 during bike cycling.

After the authentication stage S20 is completed, the controller 30 enters the operation stage S40. The operation stage has three main processing procedures, namely, a cycling information processing procedure S41, a bike information processing procedure S42, and a cycling control parameters processing procedure S43. After the smart mobile device 40 sends a cycling information inquiry request to the controller 30, the controller 30 processes the cycling status of the cycling status detection assembly 20 and then transmits the processed cycling status back to the smart mobile device 40 for the touch panel 43 of the smart mobile device 40 to display the processed cycling status. Besides, if the smart mobile device 40 is connected to the Internet, the processed cycling status can be simultaneously transmitted to an external database. Similarly, the smart mobile device 40 can also send a bike information inquiry request to the controller 30, the controller 30 transmits the processed bike information back to the smart mobile device and also to an external database through the Internet. As the user interface provided by the smart mobile device 40 allows users to set up the cycling control parameters, when receiving the cycling control parameters that users intend to configure, the smart mobile device 40 transmits a control command containing the cycling control parameters to be configured to the controller 30. The controller 30 then controls the electric motor 11 according to the cycling control parameters contained in the control command.

Figure 4:
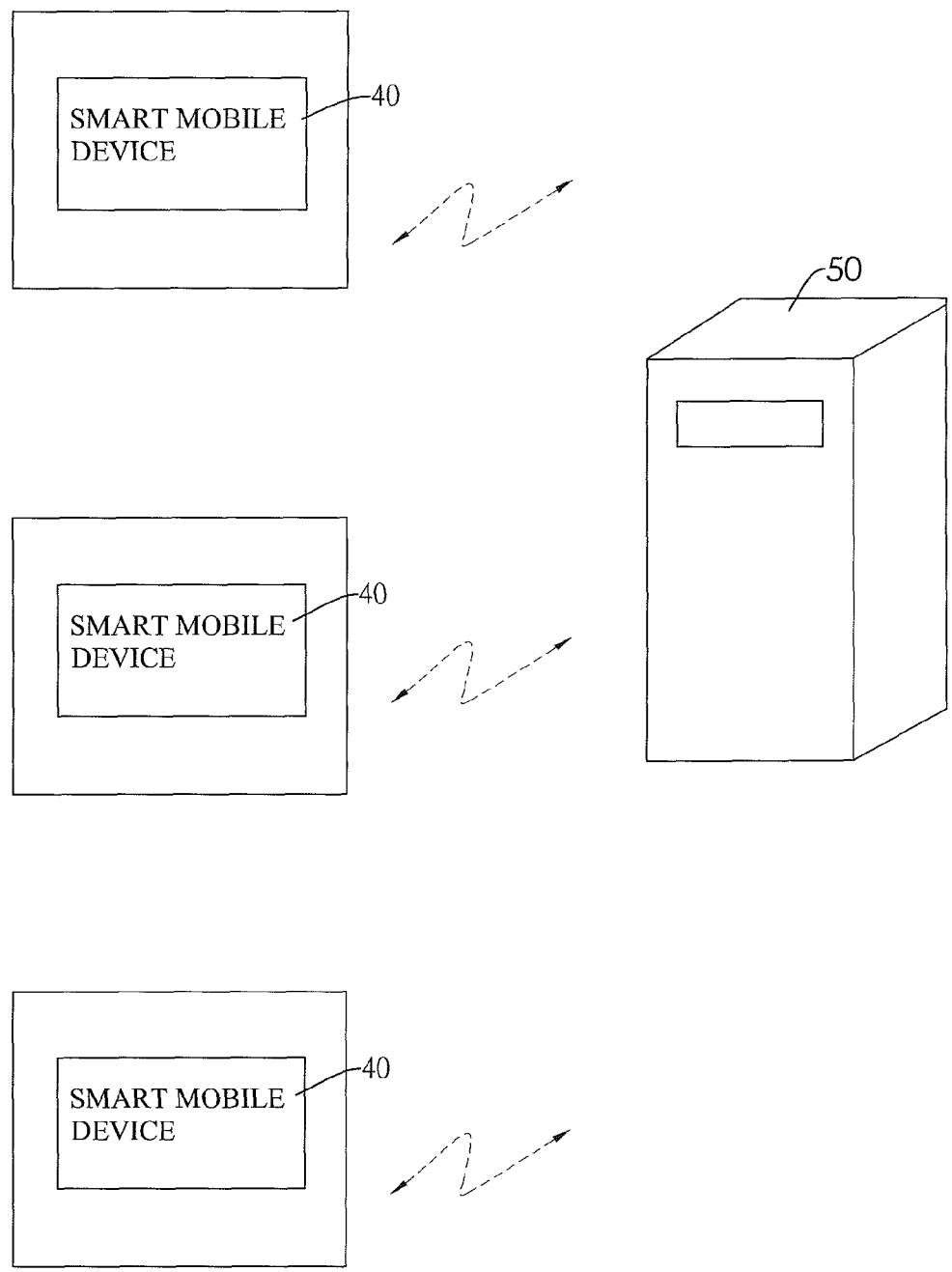
FIG. 4 is system architecture diagram of another electromechanical control system in accordance with the present invention.

The smart mobile device of the present invention can be further connected to a network platform 50. With reference to FIG. 4, the network platform 50 provides at least one application program for the smart mobile device to download and execute. The smart mobile device 40 uploads its stored cycling information and bike information to the network platform 50 through the executed application program. Hence, the network platform 50 can be used to provide diversified cloud services to cyclists.

Figure 5A:
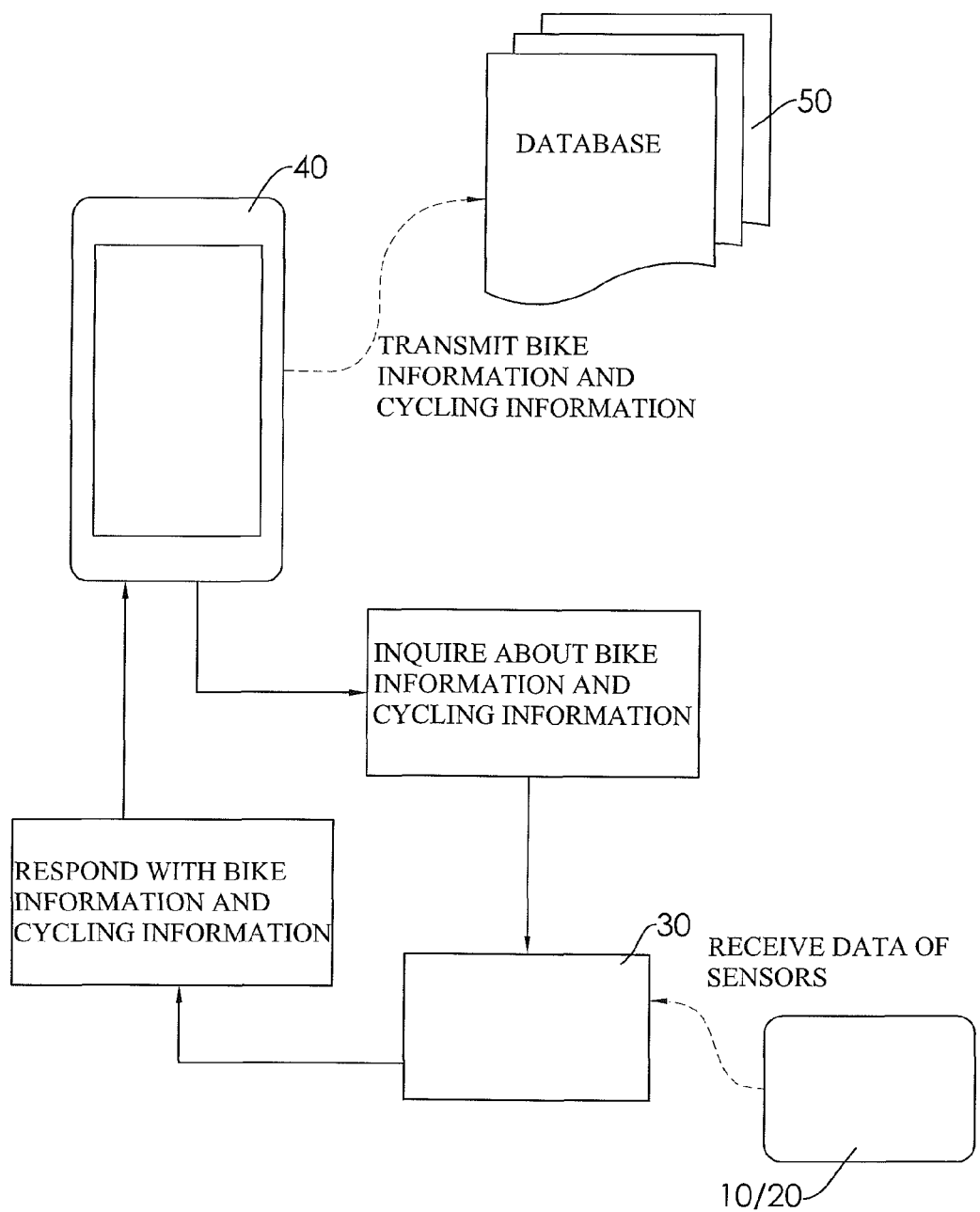
FIG. 5A is a system architecture diagram of the electromechanical control system in FIG. 4 applied to an application of uploading bike information and cycling information.
Figure 5B:
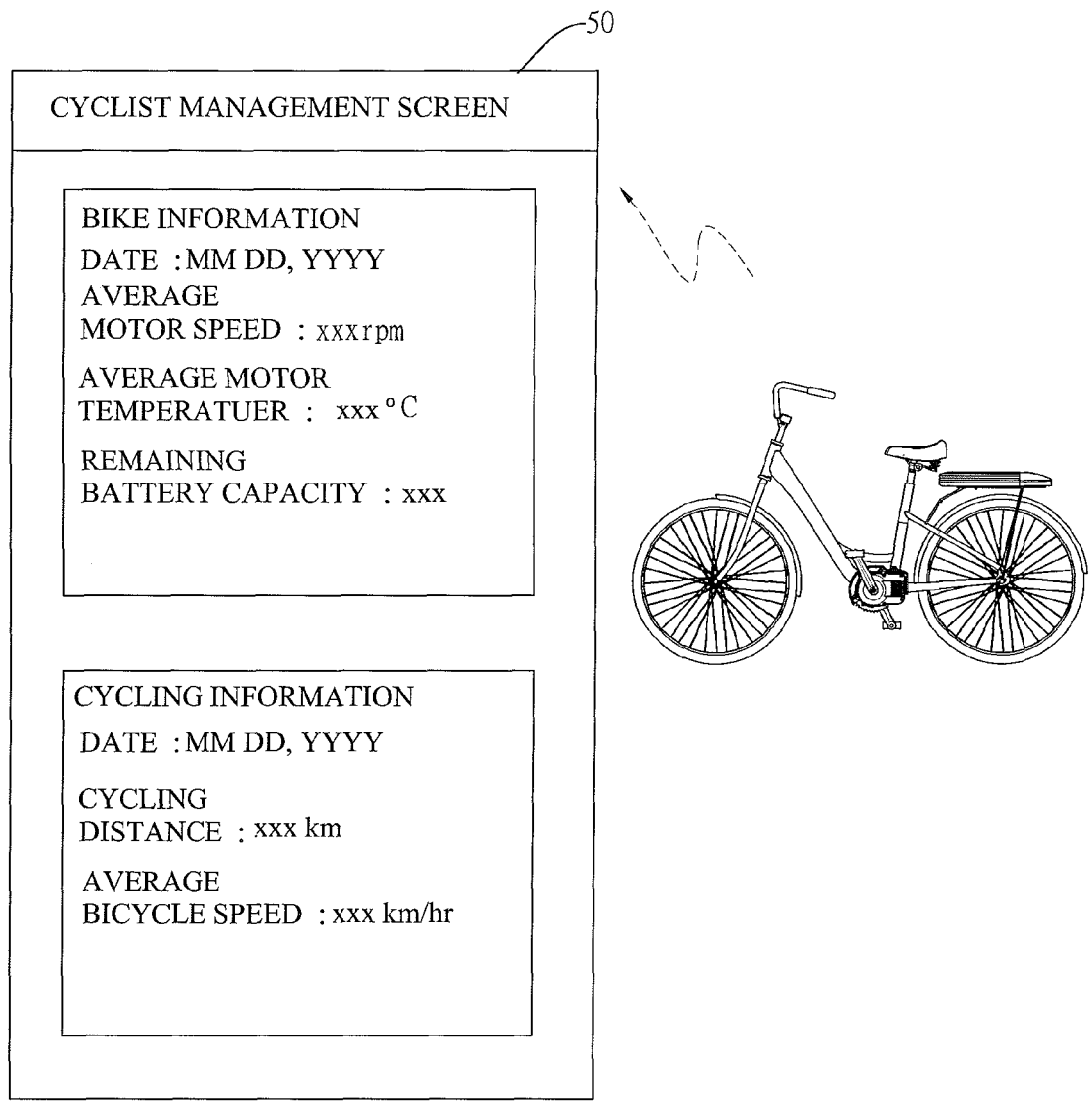
FIG. 5B is a schematic diagram illustrating a screen of the application in FIG. 5A for uploading bike information and cycling information to a database.

With reference to FIGS. 5A and 5B, to cyclists data related to bike operation that are transmitted to the database can be further analyzed to provide analysis for maintenance and service of the bike and reference for customized services, thereby predicting the possibility of trouble occurring in the bike in advance and reminding cyclists of feasible actions to take prior to the occurrence of the trouble. Therefore, bike repair shops can develop related application programs according to the present invention, and the network platform 50 provides a website collecting the cycling information and the bike information to be shared by cyclists and instant and complete repair services.

Figure 6A:
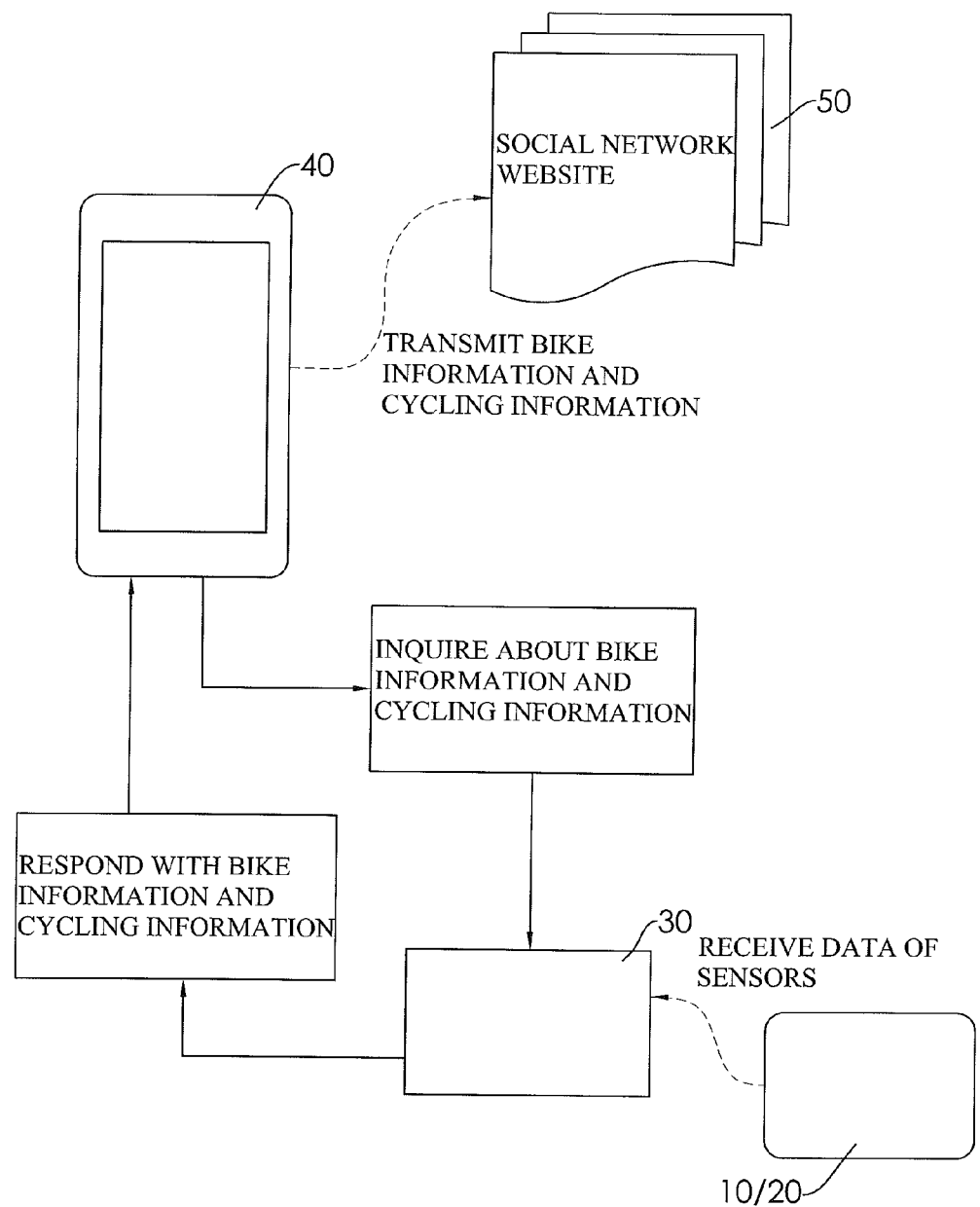
FIG. 6A is a system architecture diagram of the electromechanical control system in FIG. 4 applied to an application of sharing bike information and cycling information with social networking websites.
Figure 6B:
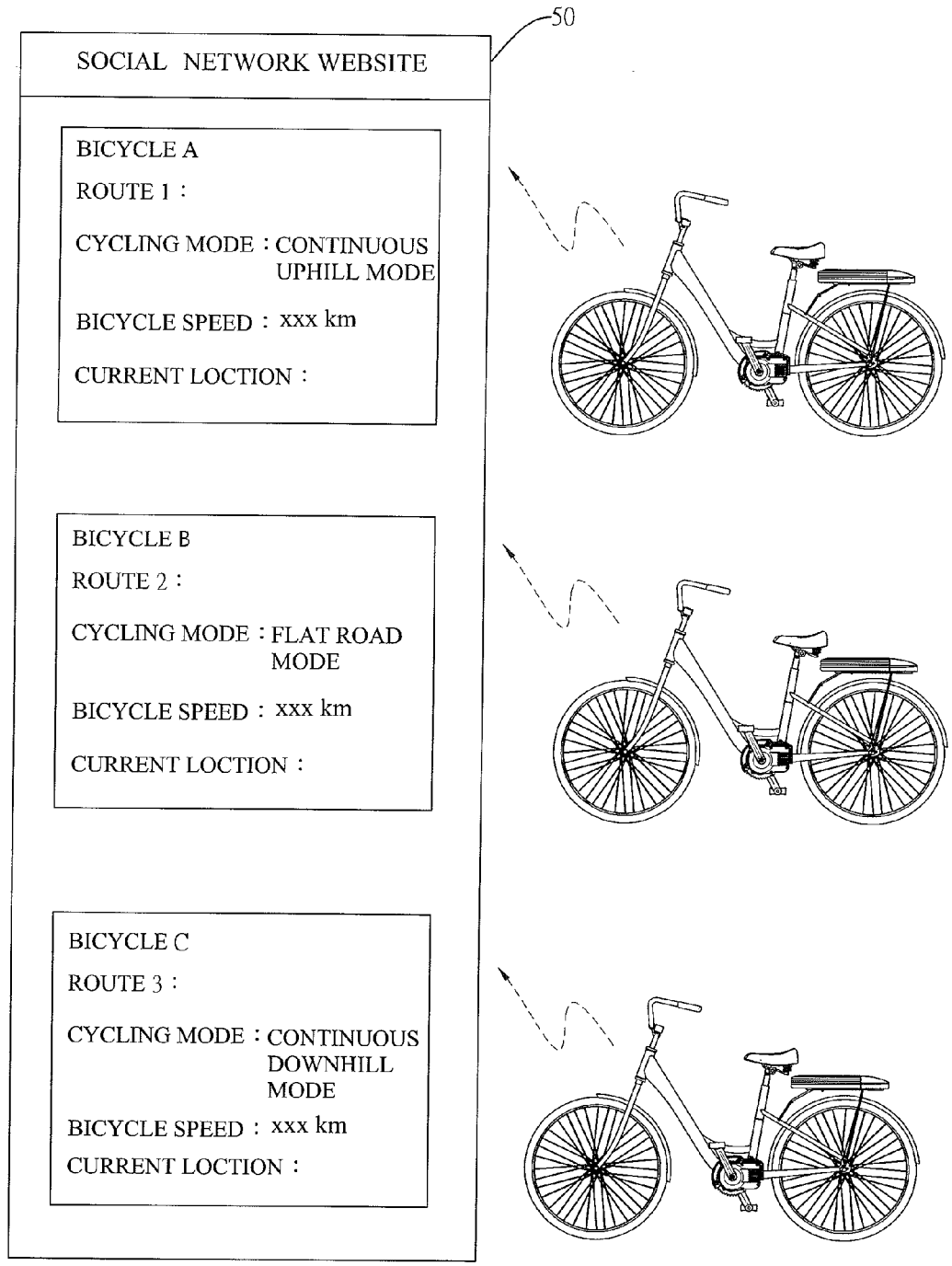
FIG. 6B is a schematic diagram illustrating a screen of the application in FIG. 6A.

With reference to FIGS. 6A and 6B, as the present invention can transmit the bike information and cycling information to the network platform 50, the network platform 50 can provide a social networking website collecting and sharing the bike information and cycling information. Cyclists can share their completed bike information and cycling information with other cyclists on social networks through the means of social networking websites.

Figure 7A:
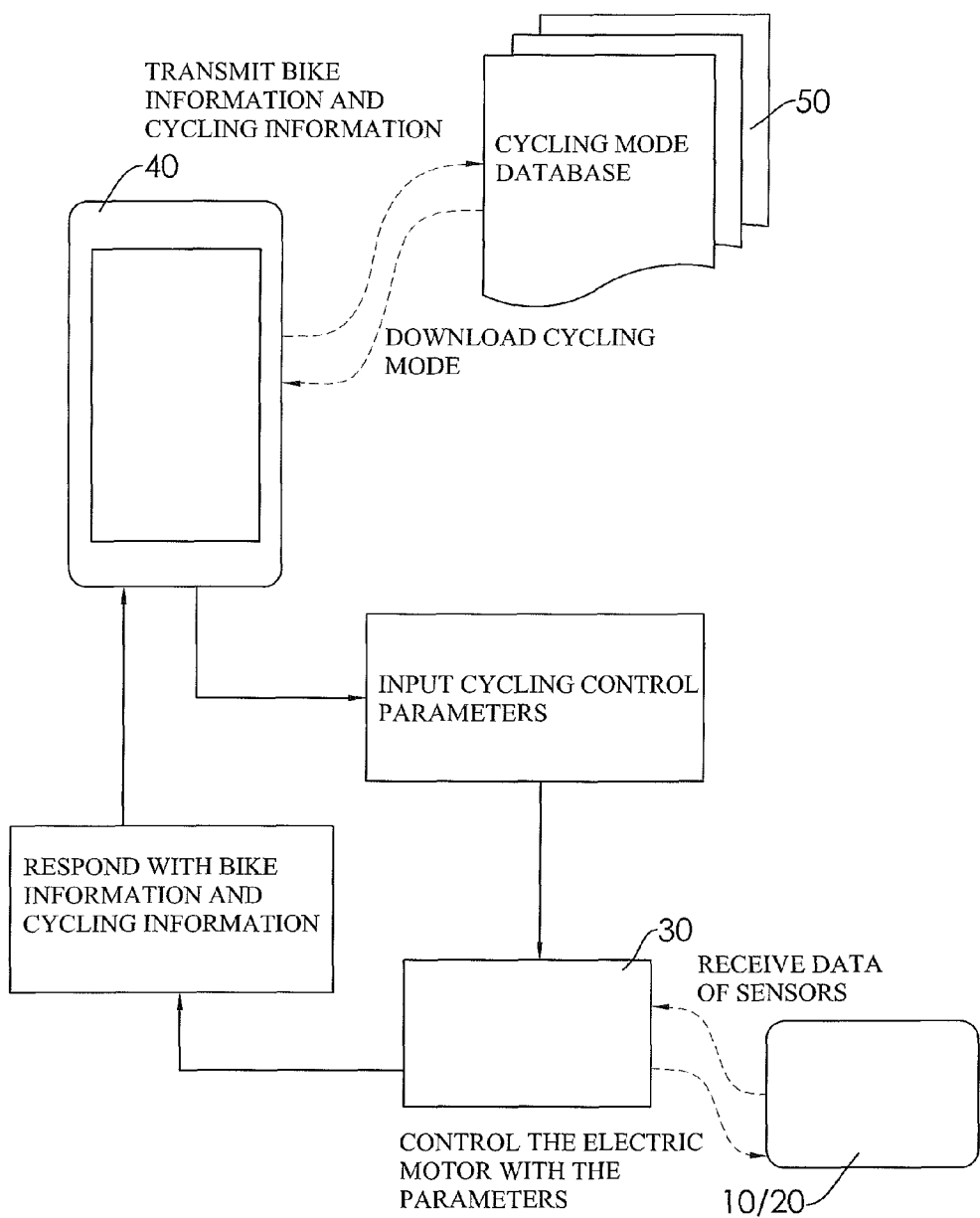
FIG. 7A is a system architecture diagram of the electromechanical control system in FIG. 4 applied to an application of downloading cycling modes.
Figure 7B:
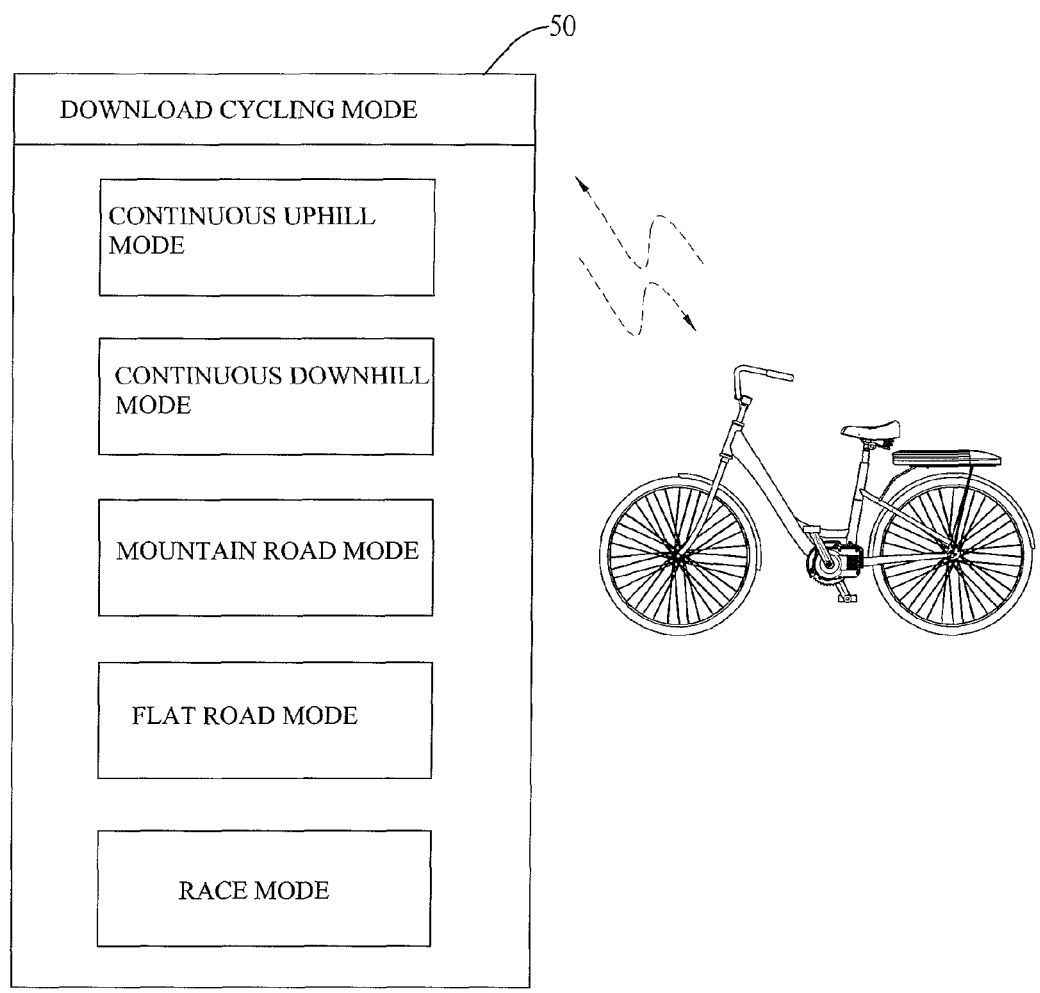
FIG. 7B is a schematic diagram illustrating a screen of the application in FIG. 7A.

With reference to FIG. 7A, when the controller 30 executes the cycling information processing procedure, the bike information processing procedure and the cycling control parameters processing procedure, users are allowed to select different cycling modes to attain a tailored workout effect. Hence, the network platform 50 of the present invention can be developed by fitness centers to provide an application program supporting multiple cycling modes each respectively having different cycling control parameters. After downloading the application program using a smart mobile device, users can connect to the network platform and selectively download desired cycling modes, and the controller 30 controls those cycling modes according to their respective cycling control parameters. With reference to FIG. 7B, users can also select a competition mode for other cyclists to share and download the cycling modes for personal workout so that cyclists can compete with each other in terms of their workout performance and get more motivated to exercise by the joy of competition. Moreover, to prevent from exceeding personal physical strength during each cycling mode, the electric motor of the present invention has a regenerative braking function, and single or multiple physiological sensors to detect the heart beat rate, the breathing rate and the like for cyclists to ride the bike under an optimal mode in consuming energy of the body.

Figure 8A:
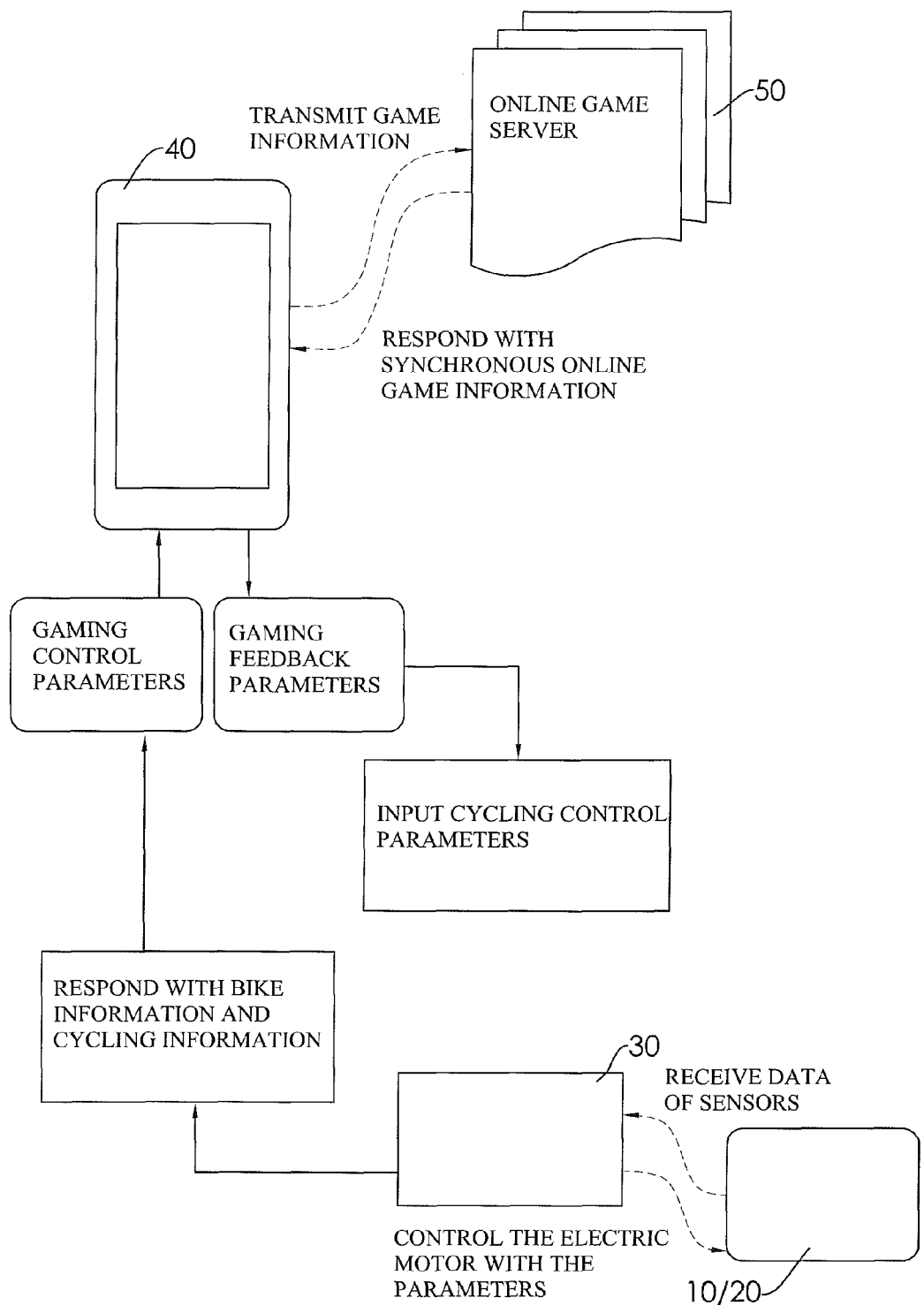
FIG. 8A is a system architecture diagram of the electromechanical control system in FIG. 4 applied to an application of downloading games with a level design.
Figure 8B:
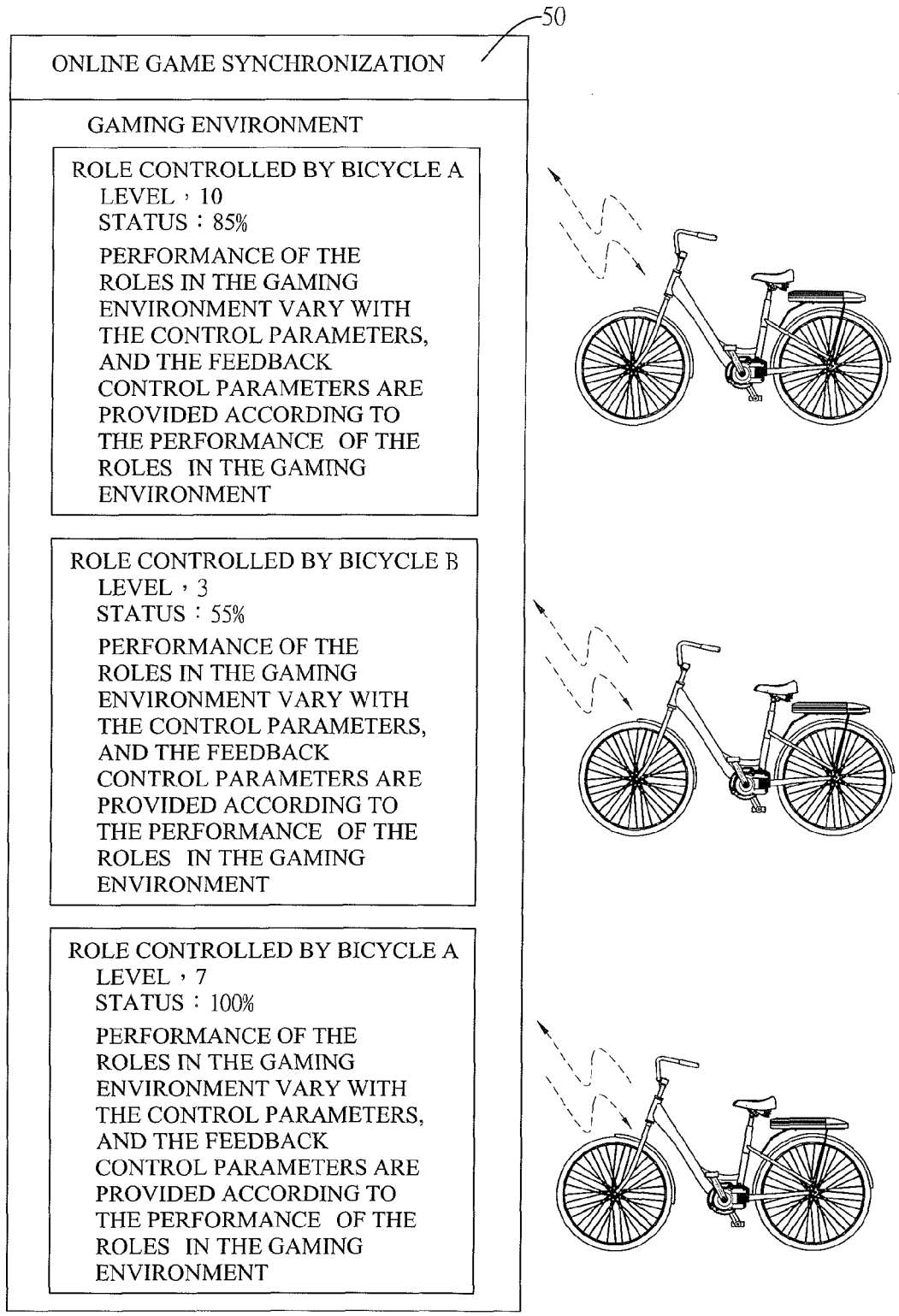
FIG. 8B is a schematic diagram illustrating a screen of the application in FIG. 8A.

With reference to FIG. 8A, application programs of the network platform 50 can be developed by game developers. In other words, the network platform 50 is an online game server for cyclists to download game levels associated with corresponding cycling control parameters for increasing or decreasing the load of the electric bike so that cyclists can play game during the cycling course to interact with the electric bike for more bike-riding pleasure. Multiple electric bikes can even establish connection to the network platform 50 with their smart mobile devices 40. An interactive game with multiple roles can be provided after logging in the network server. With reference to FIG. 8B, the game records a role controlled by each respective bike. Each role performs according to the control parameters in the game, and feedback parameters in response to reaction of each role in the game are provided to the corresponding bike to increase the group bike-riding fun of the cyclists.

The present invention targets at establishing a network platform for cyclists to download more diversified monitoring and control modes after the smart mobile device of the electromechanical control system executes the application program provided by the network platform. The operation of the electric motor of the electric bike can be remotely monitored and controlled, thereby realizing the objective of facilitating management of bike information and sharing cycling information among cyclists. Accordingly, diversified cloud services can be provided through the network platform, and the riding fun of electric bike can be further enhanced in collaboration with development of corresponding application program.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An electromechanical control system of an electric bike integrating a smart mobile device therewith, comprising:
   an electromechanical assembly adapted to have an electric motor and a battery mounted on an electric bike to drive a wheel axle of the electric bike;
   a cycling status detection assembly detecting cycling status of the electric bike and outputting the cycling status;
   a controller electrically connected to the electromechanical assembly and the cycling status detection assembly to control the operation of the electric motor, receiving the cycling status, and process the cycling status into cycling information and bike information, the controller having a communication interface and built in with a cycling control procedure and an export control procedure, wherein the cycling control procedure configures cycling control parameters for controlling the operation of the electric motor to simulate different road conditions for cycling, and controls the operation of the electric motor according to the cycling information, the bike information and the cycling control parameters, and the export control procedure makes a part of cycling control parameters openly available for external configuration, and makes the cycling information and the bike information openly available for output; and
   a smart mobile device connected to the communication interface of the controller to perform bidirectional communication therewith, and providing a user interface for launching the export control procedure of the controller, setting up the openly available cycling control parameters, and obtaining the cycling information and bike information for storage and display.

2. The electromechanical control system as claimed in claim 1, wherein the electric motor has an electric motor lock preventing the electric motor from being rotated with a mechanism.

3. The electromechanical control system as claimed in claim 2, wherein the communication interface of the controller is a wired connection interface or a wireless connection interface.

4. The electromechanical control system as claimed in claim 2, wherein the controller further has a connection procedure built therein, the connection procedure has an initialization stage, an authentication stage, and an operation stage performed in sequence, wherein the initialization stage is entered after the controller receives a connection request from the smart mobile device and the authentication stage is subsequently entered;

the authentication stage has steps of:

determining if the controller is connected to the smart mobile device according to the connection request;

if connected, determining if there is a password stored in the controller, and if there is a password stored therein, determining that the controller is authenticated, otherwise, determining that the controller is unauthenticated;

when determining that the controller is unauthenticated, notifying the smart mobile device to display a password setting interface on the user interface thereof for setting a new password; and when determining that the controller is authenticated, notifying the smart mobile device to display a password input interface on the user interface thereof for inputting a password to be authenticated, comparing the inputted password with the stored password, if they do not match, asking to input again until the inputted password and the stored password match each other, and permitting to control the operation of the electric motor.

5. The electromechanical control system as claimed in claim 4, wherein after entering the operation stage, the controller first unlocks the electric motor and then control the operation of the electric motor.

6. The electromechanical control system as claimed in claim 5, wherein after the inputted password matches the stored password during the authentication stage of the connection procedure, the controller generate a check code with a random number and transmits the check code to the smart mobile device currently connected to the controller for storage.

7. The electromechanical control system as claimed in claim 6, wherein when the controller is disconnected from the smart mobile device during the authentication stage and then receives a connection request, the controller sends a request for returning the check code to the smart mobile device issuing the connection request, and denies connection to the smart mobile device issuing the connection request if receiving incorrect check code or no check code.

8. The electromechanical control system as claimed in claim 7, wherein the controller has:

a message processing unit built in with the connection procedure to connect to the smart mobile device and perform bidirectional communication with the connected smart mobile device, further storing a control command outputted by the smart mobile device, converting the control command into a control signal, and outputting the control signal;

a control unit electrically connected to the message processing unit to receive the control signal outputted from the message processing unit, controlling the electromechanical assembly, receiving a status detection signal of the cycling status detection assembly, converting the status detection signal into status detection data, and outputs the status detection data to the message processing unit for the message processing unit to further transmit the status detection data to the connected smart mobile device.

9. The electromechanical control system as claimed in claim 1, wherein the smart mobile device has a mobile Internet module, a GPS module, a touch panel and a processor, the processor is electrically connected to the mobile Internet module, the GPS module, and the touch panel, and is connected to the Internet through the mobile Internet module, controls the touch panel to display an electronic map, and marks a current location on the electronic map according to a current geographical location of the smart mobile device.

10. The electromechanical control system as claimed in claim 9, wherein the communication interface of the controller is a wired connection interface or a wireless connection interface.

11. The electromechanical control system as claimed in claim 9, wherein the controller further has a connection procedure built therein, the connection procedure has an initialization stage, an authentication stage, and an operation stage performed in sequence, wherein the initialization stage is entered after the controller receives a connection request from the smart mobile device and the authentication stage is subsequently entered;

the authentication stage has steps of:

determining if the controller is connected to the smart mobile device according to the connection request;

if connected, determining if there is a password stored in the controller, and if there is a password stored therein, determining that the controller is authenticated, otherwise, determining that the controller is unauthenticated;

when determining that the controller is unauthenticated, notifying the smart mobile device to display a password setting interface on the user interface thereof for setting a new password; and when determining that the controller is authenticated, notifying the smart mobile device to display a password input interface on the user interface thereof for inputting a password to be authenticated, comparing the inputted password with the stored password, if they do not match, asking to input again until the inputted password and the stored password match each other, and permitting to control the operation of the electric motor.

12. The electromechanical control system as claimed in claim 11, wherein after entering the operation stage, the controller first unlocks the electric motor and then control the operation of the electric motor.

13. The electromechanical control system as claimed in claim 12, wherein after the inputted password matches the stored password during the authentication stage of the connection procedure, the controller generate a check code with a random number and transmits the check code to the smart mobile device currently connected to the controller for storage.

14. The electromechanical control system as claimed in claim 13, wherein when the controller is disconnected from the smart mobile device during the authentication stage and then receives a connection request, the controller sends a request for returning the check code to the smart mobile device issuing the connection request, and denies connection to the smart mobile device issuing the connection request if receiving incorrect check code or no check code.

15. The electromechanical control system as claimed in claim 14, wherein the controller has:
- a message processing unit built in with the connection procedure to connect to the smart mobile device and perform bidirectional communication with the connected smart mobile device, further storing a control command outputted by the smart mobile device, converting the control command into a control signal, and outputting the control signal;
- a control unit electrically connected to the message processing unit to receive the control signal outputted from the message processing unit, controlling the electromechanical assembly, receiving a status detection signal of the cycling status detection assembly, converting the status detection signal into status detection data, and outputs the status detection data to the message processing unit for the message processing unit to further transmit the status detection data to the connected smart mobile device.

16. The electromechanical control system as claimed in claim 1, wherein
- the cycling status detection assembly has a pedal detector, a speed detector, and a temperature detector;
- the bike information has an average motor speed, an average motor temperature, and a remaining battery capacity; and
- the cycling information has a cycling distance and a cycling speed.

17. The electromechanical control system as claimed in claim 16, wherein the communication interface of the controller is a wired connection interface or a wireless connection interface.

18. The electromechanical control system as claimed in claim 16, wherein the controller further has a connection procedure built therein, the connection procedure has an initialization stage, an authentication stage, and an operation stage performed in sequence, wherein
- the initialization stage is entered after the controller receives a connection request from the smart mobile device and the authentication stage is subsequently entered;
- the authentication stage has steps of:
  - determining if the controller is connected to the smart mobile device according to the connection request;
  - if connected, determining if there is a password stored in the controller, and if there is a password stored therein, determining that the controller is authenticated, otherwise, determining that the controller is unauthenticated;
  - when determining that the controller is unauthenticated, notifying the smart mobile device to display a password setting interface on the user interface thereof for setting a new password; and
  - when determining that the controller is authenticated, notifying the smart mobile device to display a password input interface on the user interface thereof for inputting a password to be authenticated, comparing the inputted password with the stored password, if they do not match, asking to input again until the inputted password and the stored password match each other, and permitting to control the operation of the electric motor.

19. The electromechanical control system as claimed in claim 18, wherein after entering the operation stage, the controller first unlocks the electric motor and then control the operation of the electric motor.

20. The electromechanical control system as claimed in claim 19, wherein after the inputted password matches the stored password during the authentication stage of the connection procedure, the controller generate a check code with a random number and transmits the check code to the smart mobile device currently connected to the controller for storage.

21. The electromechanical control system as claimed in claim 20, wherein when the controller is disconnected from the smart mobile device during the authentication stage and then receives a connection request, the controller sends a request for returning the check code to the smart mobile device issuing the connection request, and denies connection to the smart mobile device issuing the connection request if receiving incorrect check code or no check code.

22. The electromechanical control system as claimed in claim 21, wherein the controller has:
- a message processing unit built in with the connection procedure to connect to the smart mobile device and perform bidirectional communication with the connected smart mobile device, further storing a control command outputted by the smart mobile device, converting the control command into a control signal, and outputting the control signal;
- a control unit electrically connected to the message processing unit to receive the control signal outputted from the message processing unit, controlling the electromechanical assembly, receiving a status detection signal of the cycling status detection assembly, converting the status detection signal into status detection data, and outputs the status detection data to the message processing unit for the message processing unit to further transmit the status detection data to the connected smart mobile device.

23. The electromechanical control system as claimed in claim 1, wherein the cycling control parameters include rotation speed, torque and load of the electric motor.

24. The electromechanical control system as claimed in claim 23, wherein the communication interface of the controller is a wired connection interface or a wireless connection interface.

25. The electromechanical control system as claimed in claim 23, wherein the controller further has a connection procedure built therein, the connection procedure has an initialization stage, an authentication stage, and an operation stage performed in sequence, wherein
- the initialization stage is entered after the controller receives a connection request from the smart mobile device and the authentication stage is subsequently entered;
- the authentication stage has steps of:
  - determining if the controller is connected to the smart mobile device according to the connection request;
  - if connected, determining if there is a password stored in the controller, and if there is a password stored therein, determining that the controller is authenticated, otherwise, determining that the controller is unauthenticated;
  - when determining that the controller is unauthenticated, notifying the smart mobile device to display a password setting interface on the user interface thereof for setting a new password; and when determining that the controller is authenticated, notifying the smart mobile device to display a password input interface on the user interface thereof for inputting a password to be authenticated, comparing the inputted password with the stored password, if they do not match, asking to input again until the inputted password and the stored password match each other, and permitting to control the operation of the electric motor.

26. The electromechanical control system as claimed in claim 25, wherein after entering the operation stage, the controller first unlocks the electric motor and then control the operation of the electric motor.

27. The electromechanical control system as claimed in claim 26, wherein after the inputted password matches the stored password during the authentication stage of the connection procedure, the controller generate a check code with a random number and transmits the check code to the smart mobile device currently connected to the controller for storage.

28. The electromechanical control system as claimed in claim 27, wherein when the controller is disconnected from the smart mobile device during the authentication stage and then receives a connection request, the controller sends a request for returning the check code to the smart mobile device issuing the connection request, and denies connection to the smart mobile device issuing the connection request if receiving incorrect check code or no check code.

29. The electromechanical control system as claimed in claim 28, wherein the controller has:
a message processing unit built in with the connection procedure to connect to the smart mobile device and perform bidirectional communication with the connected smart mobile device, further storing a control command outputted by the smart mobile device, converting the control command into a control signal, and outputting the control signal;
a control unit electrically connected to the message processing unit to receive the control signal outputted from the message processing unit, controlling the electromechanical assembly, receiving a status detection signal of the cycling status detection assembly, converting the status detection signal into status detection data, and outputs the status detection data to the message processing unit for the message processing unit to further transmit the status detection data to the connected smart mobile device.

30. The electromechanical control system as claimed in claim 1, wherein the communication interface of the controller is a wired connection interface or a wireless connection interface.

31. The electromechanical control system as claimed in claim 1, wherein the controller further has a connection procedure built therein, the connection procedure has an initialization stage, an authentication stage, and an operation stage performed in sequence, wherein
the initialization stage is entered after the controller receives a connection request from the smart mobile device and the authentication stage is subsequently entered;
the authentication stage has steps of:
determining if the controller is connected to the smart mobile device according to the connection request;
if connected, determining if there is a password stored in the controller, and if there is a password stored therein, determining that the controller is authenticated, otherwise, determining that the controller is unauthenticated;

when determining that the controller is unauthenticated, notifying the smart mobile device to display a password setting interface on the user interface thereof for setting a new password; and when determining that the controller is authenticated, notifying the smart mobile device to display a password input interface on the user interface thereof for inputting a password to be authenticated, comparing the inputted password with the stored password, if they do not match, asking to input again until the inputted password and the stored password match each other, and permitting to control the operation of the electric motor.

32. The electromechanical control system as claimed in claim 31, wherein after entering the operation stage, the controller first unlocks the electric motor and then control the operation of the electric motor.

33. The electromechanical control system as claimed in claim 32, wherein after the inputted password matches the stored password during the authentication stage of the connection procedure, the controller generate a check code with a random number and transmits the check code to the smart mobile device currently connected to the controller for storage.

34. The electromechanical control system as claimed in claim 33, wherein when the controller is disconnected from the smart mobile device during the authentication stage and then receives a connection request, the controller sends a request for returning the check code to the smart mobile device issuing the connection request, and denies connection to the smart mobile device issuing the connection request if receiving incorrect check code or no check code.

35. The electromechanical control system as claimed in claim 34, wherein the controller has:
a message processing unit built in with the connection procedure to connect to the smart mobile device and perform bidirectional communication with the connected smart mobile device, further storing a control command outputted by the smart mobile device, converting the control command into a control signal, and outputting the control signal;
a control unit electrically connected to the message processing unit to receive the control signal outputted from the message processing unit, controlling the electromechanical assembly, receiving a status detection signal of the cycling status detection assembly, converting the status detection signal into status detection data, and outputs the status detection data to the message processing unit for the message processing unit to further transmit the status detection data to the connected smart mobile device.

36. An electromechanical control system of an electric bike integrating cloud services therewith, comprising:
an electromechanical assembly adapted to have an electric motor and a battery mounted on an electric bike to drive a wheel axle of the electric bike;
a cycling status detection assembly detecting cycling status of the electric bike and outputting the cycling status;
a controller electrically connected to the electromechanical assembly and the cycling status detection assembly to control the operation of the electric motor, receiving the cycling status, and process the cycling status into cycling information and bike information, the controller having a communication interface and built in with a cycling control procedure and an export control procedure, wherein the cycling control procedure configures cycling control parameters for controlling the operation of the electric motor to simulate different road conditions for cycling, and controls the operation of the electric motor according to the cycling information, the bike information and the cycling control parameters, and the export control procedure makes a part of cycling control parameters openly available for external configuration, and makes the cycling information and the bike information openly available for output;

a smart mobile device connected to the communication interface of the controller to perform bidirectional communication therewith, and providing a user interface for launching the export control procedure of the controller, setting up the openly available cycling control parameters, and obtaining the cycling information and bike information for storage and display; and a network platform providing at least one application program for the smart mobile device to download and execute, wherein the smart mobile device uploads its stored cycling information and bike information to the network platform through the executed application program.

37. The electromechanical control system as claimed in claim 36, wherein the electric motor has an electric motor lock preventing the electric motor from being rotated with a mechanism.

38. The electromechanical control system as claimed claim 37, wherein the communication interface of the controller is a wired connection interface or a wireless connection interface.

39. The electromechanical control system as claimed in claim 37, wherein the controller further has a connection procedure built therein, the connection procedure has an initialization stage, an authentication stage, and an operation stage performed in sequence, wherein the initialization stage is entered after the controller receives a connection request from the smart mobile device and the authentication stage is subsequently entered;

the authentication stage has steps of:
determining if the controller is connected to the smart mobile device according to the connection request;
if connected, determining if there is a password stored in the controller, and if there is a password stored therein, determining that the controller is authenticated, otherwise, determining that the controller is unauthenticated;
when determining that the controller is unauthenticated, notifying the smart mobile device to display a password setting interface on the user interface thereof for setting a new password; and
when determining that the controller is authenticated, notifying the smart mobile device to display a password input interface on the user interface thereof for inputting a password to be authenticated, comparing the inputted password with the stored password, if they do not match, asking to input again until the inputted password and the stored password match each other, and permitting to control the operation of the electric motor.

40. The electromechanical control system as claimed in claim 39, wherein after entering the operation stage, the controller first unlocks the electric motor and then control the operation of the electric motor.

41. The electromechanical control system as claimed in claim 40, wherein after the inputted password matches the stored password during the authentication stage of the connection procedure, the controller generate a check code with a random number and transmits the check code to the smart mobile device currently connected to the controller for storage.

42. The electromechanical control system as claimed in claim 41, wherein when the controller is disconnected from the smart mobile device during the authentication stage and then receives a connection request, the controller sends a request for returning the check code to the smart mobile device issuing the connection request, and denies connection to the smart mobile device issuing the connection request if receiving incorrect check code or no check code.

43. The electromechanical control system as claimed in claim 42, wherein the controller has:
a message processing unit built in with the connection procedure to connect to the smart mobile device and perform bidirectional communication with the connected smart mobile device, further storing a control command outputted by the smart mobile device, converting the control command into a control signal, and outputting the control signal;
a control unit electrically connected to the message processing unit to receive the control signal outputted from the message processing unit, controlling the electromechanical assembly, receiving a status detection signal of the cycling status detection assembly, converting the status detection signal into status detection data, and outputting the status detection data to the message processing unit for the message processing unit to further transmit the status detection data to the connected smart mobile device.

44. The electromechanical control system as claimed in claim 43, wherein the network platform provides a website collecting the cycling information and the bike information.

45. The electromechanical control system as claimed in claim 43, wherein the network platform provides a social networking website collecting and sharing the cycling information and the bike information.

46. The electromechanical control system as claimed in claim 43, wherein the network platform provides an application program supporting multiple cycling modes each respectively having different cycling control parameters.

47. The electromechanical control system as claimed in claim 43, wherein the network platform is an online game server having different game levels associated with corresponding cycling control parameters.

48. The electromechanical control system as claimed in claim 36, wherein the smart mobile device has a mobile Internet module, a GPS module, a touch panel and a processor, the processor is electrically connected to the mobile Internet module, the GPS module, and the touch panel, and is connected to the Internet through the mobile Internet module, controls the touch panel to display an electronic map, and marks a current location on the electronic map according to a current geographical location of the smart mobile device.

49. The electromechanical control system as claimed claim 48, wherein the communication interface of the controller is a wired connection interface or a wireless connection interface.

50. The electromechanical control system as claimed in claim 48, wherein the controller further has a connection procedure built therein, the connection procedure has an initialization stage, an authentication stage, and an operation stage performed in sequence, wherein the initialization stage is entered after the controller receives a connection request from the smart mobile device and the authentication stage is subsequently entered;

the authentication stage has steps of:
- determining if the controller is connected to the smart mobile device according to the connection request;
- if connected, determining if there is a password stored in the controller, and if there is a password stored therein, determining that the controller is authenticated, otherwise, determining that the controller is unauthenticated;
- when determining that the controller is unauthenticated, notifying the smart mobile device to display a password setting interface on the user interface thereof for setting a new password; and
- when determining that the controller is authenticated, notifying the smart mobile device to display a password input interface on the user interface thereof for inputting a password to be authenticated, comparing the inputted password with the stored password, if they do not match, asking to input again until the inputted password and the stored password match each other, and permitting to control the operation of the electric motor.

51. The electromechanical control system as claimed in claim 50, wherein after entering the operation stage, the controller first unlocks the electric motor and then control the operation of the electric motor.

52. The electromechanical control system as claimed in claim 51, wherein after the inputted password matches the stored password during the authentication stage of the connection procedure, the controller generate a check code with a random number and transmits the check code to the smart mobile device currently connected to the controller for storage.

53. The electromechanical control system as claimed in claim 52, wherein when the controller is disconnected from the smart mobile device during the authentication stage and then receives a connection request, the controller sends a request for returning the check code to the smart mobile device issuing the connection request, and denies connection to the smart mobile device issuing the connection request if receiving incorrect check code or no check code.

54. The electromechanical control system as claimed in claim 53, wherein the controller has:
- a message processing unit built in with the connection procedure to connect to the smart mobile device and perform bidirectional communication with the connected smart mobile device, further storing a control command outputted by the smart mobile device, converting the control command into a control signal, and outputting the control signal;
- a control unit electrically connected to the message processing unit to receive the control signal outputted from the message processing unit, controlling the electromechanical assembly, receiving a status detection signal of the cycling status detection assembly, converting the status detection signal into status detection data, and outputting the status detection data to the message processing unit for the message processing unit to further transmit the status detection data to the connected smart mobile device.

55. The electromechanical control system as claimed in claim 54, wherein the network platform provides a website collecting the cycling information and the bike information.

56. The electromechanical control system as claimed in claim 54, wherein the network platform provides a social networking website collecting and sharing the cycling information and the bike information.

57. The electromechanical control system as claimed in claim 54, wherein the network platform provides an application program supporting multiple cycling modes each respectively having different cycling control parameters.

58. The electromechanical control system as claimed in claim 54, wherein the network platform is an online game server having different game levels associated with corresponding cycling control parameters.

59. The electromechanical control system as claimed in claim 36, wherein
- the cycling status detection assembly has a pedal detector, a speed detector, and a temperature detector;
- the bike information has an average motor speed, an average motor temperature, and a remaining battery capacity; and
- the cycling information has a cycling distance and a cycling speed.

60. The electromechanical control system as claimed claim 59, wherein the communication interface of the controller is a wired connection interface or a wireless connection interface.

61. The electromechanical control system as claimed in claim 59, wherein the controller further has a connection procedure built therein, the connection procedure has an initialization stage, an authentication stage, and an operation stage performed in sequence, wherein
the initialization stage is entered after the controller receives a connection request from the smart mobile device and the authentication stage is subsequently entered;

the authentication stage has steps of:
- determining if the controller is connected to the smart mobile device according to the connection request;
- if connected, determining if there is a password stored in the controller, and if there is a password stored therein, determining that the controller is authenticated, otherwise, determining that the controller is unauthenticated;
- when determining that the controller is unauthenticated, notifying the smart mobile device to display a password setting interface on the user interface thereof for setting a new password; and
- when determining that the controller is authenticated, notifying the smart mobile device to display a password input interface on the user interface thereof for inputting a password to be authenticated, comparing the inputted password with the stored password, if they do not match, asking to input again until the inputted password and the stored password match each other, and permitting to control the operation of the electric motor.

62. The electromechanical control system as claimed in claim 61, wherein after entering the operation stage, the controller first unlocks the electric motor and then control the operation of the electric motor.

63. The electromechanical control system as claimed in claim 62, wherein after the inputted password matches the stored password during the authentication stage of the connection procedure, the controller generate a check code with a random number and transmits the check code to the smart mobile device currently connected to the controller for storage.

64. The electromechanical control system as claimed in claim 63, wherein when the controller is disconnected from the smart mobile device during the authentication stage and then receives a connection request, the controller sends a request for returning the check code to the smart mobile device issuing the connection request, and denies connection to the smart mobile device issuing the connection request if receiving incorrect check code or no check code.

65. The electromechanical control system as claimed in claim 64, wherein the controller has:
a message processing unit built in with the connection procedure to connect to the smart mobile device and perform bidirectional communication with the connected smart mobile device, further storing a control command outputted by the smart mobile device, converting the control command into a control signal, and outputting the control signal;
a control unit electrically connected to the message processing unit to receive the control signal outputted from the message processing unit, controlling the electromechanical assembly, receiving a status detection signal of the cycling status detection assembly, converting the status detection signal into status detection data, and outputting the status detection data to the message processing unit for the message processing unit to further transmit the status detection data to the connected smart mobile device.

66. The electromechanical control system as claimed in claim 65, wherein the network platform provides a website collecting the cycling information and the bike information.

67. The electromechanical control system as claimed in claim 65, wherein the network platform provides a social networking website collecting and sharing the cycling information and the bike information.

68. The electromechanical control system as claimed in claim 65, wherein the network platform provides an application program supporting multiple cycling modes each respectively having different cycling control parameters.

69. The electromechanical control system as claimed in claim 65, wherein the network platform is an online game server having different game levels associated with corresponding cycling control parameters.

70. The electromechanical control system as claimed in claim 36, wherein the cycling control parameters include rotation speed, torque and load of the electric motor.

71. The electromechanical control system as claimed claim 70, wherein the communication interface of the controller is a wired connection interface or a wireless connection interface.

72. The electromechanical control system as claimed in claim 70, wherein the controller further has a connection procedure built therein, the connection procedure has an initialization stage, an authentication stage, and an operation stage performed in sequence, wherein
the initialization stage is entered after the controller receives a connection request from the smart mobile device and the authentication stage is subsequently entered;
the authentication stage has steps of:
determining if the controller is connected to the smart mobile device according to the connection request;
if connected, determining if there is a password stored in the controller, and if there is a password stored therein, determining that the controller is authenticated, otherwise, determining that the controller is unauthenticated;
when determining that the controller is unauthenticated, notifying the smart mobile device to display a password setting interface on the user interface thereof for setting a new password; and
when determining that the controller is authenticated, notifying the smart mobile device to display a password input interface on the user interface thereof for inputting a password to be authenticated, comparing the inputted password with the stored password, if they do not match, asking to input again until the inputted password and the stored password match each other, and permitting to control the operation of the electric motor.

73. The electromechanical control system as claimed in claim 72, wherein after entering the operation stage, the controller first unlocks the electric motor and then control the operation of the electric motor.

74. The electromechanical control system as claimed in claim 73, wherein after the inputted password matches the stored password during the authentication stage of the connection procedure, the controller generate a check code with a random number and transmits the check code to the smart mobile device currently connected to the controller for storage.

75. The electromechanical control system as claimed in claim 74, wherein when the controller is disconnected from the smart mobile device during the authentication stage and then receives a connection request, the controller sends a request for returning the check code to the smart mobile device issuing the connection request, and denies connection to the smart mobile device issuing the connection request if receiving incorrect check code or no check code.

76. The electromechanical control system as claimed in claim 75, wherein the controller has:
a message processing unit built in with the connection procedure to connect to the smart mobile device and perform bidirectional communication with the connected smart mobile device, further storing a control command outputted by the smart mobile device, converting the control command into a control signal, and outputting the control signal;
a control unit electrically connected to the message processing unit to receive the control signal outputted from the message processing unit, controlling the electromechanical assembly, receiving a status detection signal of the cycling status detection assembly, converting the status detection signal into status detection data, and outputting the status detection data to the message processing unit for the message processing unit to further transmit the status detection data to the connected smart mobile device.

77. The electromechanical control system as claimed in claim 46, wherein the network platform provides a website collecting the cycling information and the bike information.

78. The electromechanical control system as claimed in claim 76, wherein the network platform provides a social networking website collecting and sharing the cycling information and the bike information.

79. The electromechanical control system as claimed in claim 76, wherein the network platform provides an application program supporting multiple cycling modes each respectively having different cycling control parameters.

80. The electromechanical control system as claimed in claim 76, wherein the network platform is an online game server having different game levels associated with corresponding cycling control parameters.

81. The electromechanical control system as claimed claim 36, wherein the communication interface of the controller is a wired connection interface or a wireless connection interface.

82. The electromechanical control system as claimed in claim 36, wherein the controller further has a connection procedure built therein, the connection procedure has an initialization stage, an authentication stage, and an operation stage performed in sequence, wherein
the initialization stage is entered after the controller receives a connection request from the smart mobile device and the authentication stage is subsequently entered;
the authentication stage has steps of:
determining if the controller is connected to the smart mobile device according to the connection request;
if connected, determining if there is a password stored in the controller, and if there is a password stored therein, determining that the controller is authenticated, otherwise, determining that the controller is unauthenticated;
when determining that the controller is unauthenticated, notifying the smart mobile device to display a password setting interface on the user interface thereof for setting a new password; and
when determining that the controller is authenticated, notifying the smart mobile device to display a password input interface on the user interface thereof for inputting a password to be authenticated, comparing the inputted password with the stored password, if they do not match, asking to input again until the inputted password and the stored password match each other, and permitting to control the operation of the electric motor.

83. The electromechanical control system as claimed in claim 82, wherein after entering the operation stage, the controller first unlocks the electric motor and then control the operation of the electric motor.

84. The electromechanical control system as claimed in claim 83, wherein after the inputted password matches the stored password during the authentication stage of the connection procedure, the controller generate a check code with a random number and transmits the check code to the smart mobile device currently connected to the controller for storage.

85. The electromechanical control system as claimed in claim 84, wherein when the controller is disconnected from the smart mobile device during the authentication stage and then receives a connection request, the controller sends a request for returning the check code to the smart mobile device issuing the connection request, and denies connection to the smart mobile device issuing the connection request if receiving incorrect check code or no check code.

86. The electromechanical control system as claimed in claim 85, wherein the controller has:
a message processing unit built in with the connection procedure to connect to the smart mobile device and perform bidirectional communication with the connected smart mobile device, further storing a control command outputted by the smart mobile device, converting the control command into a control signal, and outputting the control signal;
a control unit electrically connected to the message processing unit to receive the control signal outputted from the message processing unit, controlling the electromechanical assembly, receiving a status detection signal of the cycling status detection assembly, converting the status detection signal into status detection data, and outputting the status detection data to the message processing unit for the message processing unit to further transmit the status detection data to the connected smart mobile device.

87. The electromechanical control system as claimed in claim 86, wherein the network platform provides a website collecting the cycling information and the bike information.

88. The electromechanical control system as claimed in claim 86, wherein the network platform provides a social networking website collecting and sharing the cycling information and the bike information.

89. The electromechanical control system as claimed in claim 86, wherein the network platform provides an application program supporting multiple cycling modes each respectively having different cycling control parameters.

90. The electromechanical control system as claimed in claim 86, wherein the network platform is an online game server having different game levels associated with corresponding cycling control parameters.

* * * * *